Feb. 11, 1969  E. J. ARO  3,426,886
ARRANGEMENT FOR THE CONVEYANCE OF TIMBER TO SEVERAL
SUCCESSIVE POINTS OF CONSUMPTION
Filed Jan. 5, 1967
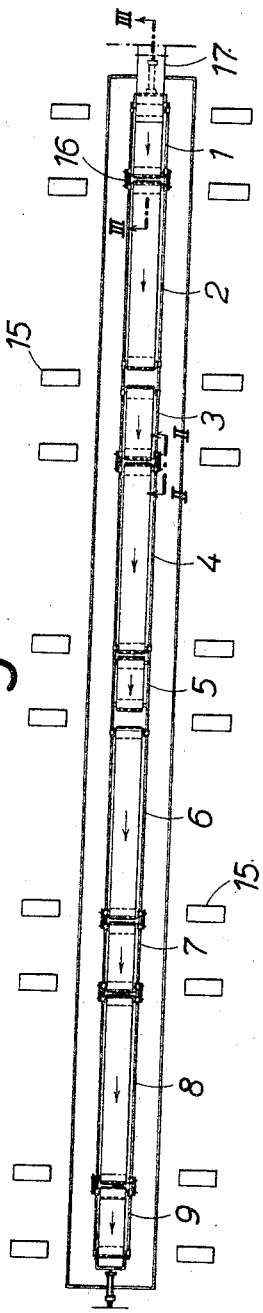
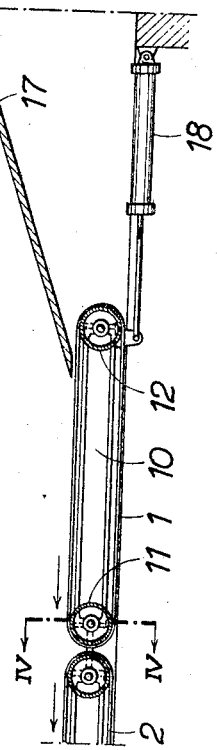
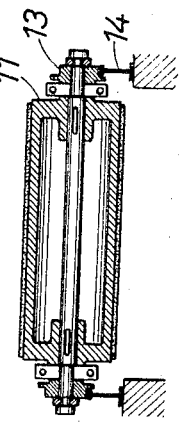
INVENTOR:
ERKKI JOHANNES ARO
BY
McGlew and Toren
Attorneys

United States Patent Office 3,426,886
Patented Feb. 11, 1969

3,426,886
ARRANGEMENT FOR THE CONVEYANCE OF TIMBER TO SEVERAL SUCCESSIVE POINTS OF CONSUMPTION
Erkki Johannes Aro, Hyvinkaa, Finland
Filed Jan. 5, 1967, Ser. No. 607,570
U.S. Cl. 198—92
Int. Cl. B65g 37/00, 47/52
9 Claims

ABSTRACT OF THE DISCLOSURE

This invention relates to an arrangement for the conveyance of timber to several successive points of consumption, the arrangement comprising a conveyor way for timber composed of several successive, continuous belt, chain or cable conveyors on which the timber is transferred from one conveyor to the next, the gap between conveyors opening up to feed timber to the point of consumption. According to the invention the conveyors are movable along the axis of conveyor way, whereby one or more conveyors are coupled-up with a shifting device and the conveyor in question and those next to it can be connected-up and disconnected from each other so that the gap formed by disengaging the connection between any two conveyors can be closed again by means of the shifting device.

---

The invention refers to an arrangement for the conveyance of timber to several successive points of consumption; the arrangement taking the form of a conveyor way for timber composed of several successive, continuous belt, chain or cable conveyors on which the timber is transferred from one conveyor to the next, the gap between conveyors opening up to feed timber to the corresponding point of consumption.

In a known arrangement of this kind the length of each conveyor is variable, enabling the gap between two conveyors to be opened and closed. For this purpose one end of each conveyor rests on a mobile carriage running along the axis of the conveyor while the opposite end is fixed. The carriage is furthermore provided with auxiliary rollers, over which the chain or the like is run, ensuring that a comparatively uniform tension of the chain is maintained regardless of changes in the length of the conveyor.

This known arrangement reveals a few essential disadvantages. Since the length of the conveyor is changed while timber is being fed to the consumption point in question, the tensioning of the chain will alter with time, causing unnecessary wear on chain or sprocket.

The timber forms a uniform covering over the entire conveyor way. As the gap between two conveyors opens by reducing the length of one of them, the entire quantity of timber then present at the open gap will fall down. As a result, too much timber may be discharged at the consumption point. On the other hand, the conveyor unit will be subjected to a considerable load due to the large quantity of discharged timber.

When the open gap is then closed by expanding the conveyor, an area free of timber will form at this point, which may cause difficulties at the rear section of the conveyor way when feeding timber to the corresponding consumption point.

The purpose of the present invention is to eliminate the disadvantages referred to above, and the new arrangement in accordance with the invention is chiefly characterized in that it permits the conveyors to move along the axis of the way with no change in length, one or more conveyors being coupled-up with the shifting device, and it being possible to connect-up and disconnect from each other, the conveyor in question and those next to it, so that having disengaged the connection between any two conveyors the gap between them can be opened and then closed again by means of the shifting device.

In this arrangement the length of the conveyors remain unchanged. Consequently, no special adjustments have to be made of the tension of the chains, belts, etc. In addition, this arrangement requires no auxiliary rollers or sprockets to equalize the changes in the length of the conveyors.

When the gap between two conveyors opens, only the amount of timber is fed to the consumption point as is determined by the rolling angle; in other words only a few logs.

When the gap is then closed, there will be no area free of timber at the corresponding point. One advantageous feature of the invention is characterized in that it incorporates two shifting devices and that they are located at the two ends of the conveyor way. This is of particular interest in the case of long conveyor ways and ensures a timber feed that is twice as rapid as when using a single shifting device.

The invention is described in greater detail in the following with reference to the appended drawing in which
FIG. 1 shows the conveyor way seen from above;
FIG. 2 shows a cross-section along II—II in FIG. 1;
FIG. 3 shows a cross-section along III—III in FIG. 1;
FIG. 4 shows a cross-section along IV—IV in FIG. 3.

In accordance with FIG. 1 the conveyor way is formed by conveyors 1–9. Each conveyor is provided with its own drive unit (not shown). At each end of a frame or carriage 10 are journalled belt rollers 11 and 12, the front one of which (in the feed direction) being live. Journalled on the axles of rollers 11 and 12 are runners 13 which move along rails 14.

Reference number 15 indicates consumption points for wood such as grinder intakes located on a lower level than the conveyor way. Carried cross-ways in the case illustrated by the drawing, the wood is released through the gap between two conveyors and then moved to either side and fed into intake 15.

Conveyors 1–4 may be coupled-up into one series, and the same applies to conveyors 6–9. For this purpose a hook 16 is journalled on both ends of the axle of live belt rollers 11 and designed to engage with the ends of the axle of belt roller 12 next ahead.

Conveyor 5 cannot move in the axis of the conveyor way and it cannot be coupled-up with the conveyors on either end (4 and 6).

Reference number 17 indicates a sloping surface down which the logs are rolled onto conveyor 1. The wood forms a uniform coverage over conveyors 1–9. Should timber be required, for instance, at the consumption point between conveyors 2 and 3, hooks 16 connecting these conveyors are disengaged. Shifting device 18, a hydraulic ram as per the drawing, then retracts conveyors 1 and 2 sufficiently to open the gap between conveyors 2 and 3. This position is illustrated in FIG. 1. A few logs fall through the gap to be followed by additional ones when conveyors 1 and 2 are started-up. When a sufficient number of logs has been discharged, conveyors 1 and 2 are stopped and the gap between conveyors 2 and 3 closed by means of hydraulic ram 18.

If timber is required, for instance, at the consumption point between conveyors 5 and 6, the hydraulic ram located at the front end of the conveyor way will pull conveyors 6–9 sufficiently forward to open the gap between conveyors 5 and 6. Conveyors 1–5 are then started-up and an adequate amount of wood fed to the consumption point. Finally, the gap between conveyors 5 and 6 is closed by means of the hydraulic ram at the front end of the conveyor way.

The above description and the drawing are intended only to illustrate the basic concept of the invention; various design modifications are of course possible within the framework of the patent claims. This applies, for instance, to the shifting device which could take such forms as an electric motor rather than a hydraulic ram.

I claim:
1. An apparatus for conveying logs and the like to a number of spaced receiving stations comprises means for forming a track affording a longitudinal path of travel extending along and for at least the extent of the spaced receiving stations, a plurality of individual conveyors disposed in end-to-end relationship and supported on said track and arranged for longitudinal movement therealong, individually disconnectable connector means for securing the adjacent ends of said conveyors together into a train for forming a continuous conveyor surface, individual drive means being associated with each said conveyor, at least one reciprocating means one end of which is secured in a stationary position along said track and the other end thereof being secured to one of said conveyors and arranged to displace the one of said conveyors to which it is attached and any other said conveyors connected thereto in a train in the longitudinal direction along said track away from an adjacent end of a disconnected one of said conveyors whereby an open space is formed between said disconnected ends of said conveyors at one of the receiving stations and said conveyors being individually driven for selectively discharging logs from said conveyors to the open space formed.

2. An apparatus as set forth in claim 1, wherein loading means are provided at one end of said track for supplying material to said conveyors.

3. An apparatus as set forth in claim 2, wherein said loading means comprises a ramp sloping downwardly toward and terminating closely above the surface of one of said conveyors at one end of said track.

4. An apparatus as set forth in claim 1, wherein each of said conveyors comprise a roller disposed at each end of said conveyor, an axle in each said roller, and support means disposed in rolling engagement with said track for journalling the opposite ends of said axle.

5. An apparatus as set forth in claim 4, wherein said connector means comprises a member being fixedly secured to said axle of said roller at one end of one of said conveyors and arranged for being releasably secured to said axle of said roller at the juxtaposed end of the adjacent said conveyor.

6. An apparatus as set forth in claim 1, wherein said track is disposed in a horizontal plane and is arranged to provide a horizontal conveyor surface.

7. An apparatus as set forth in claim 1, wherein a first group of said conveyors is arranged for being connected together by said connector means for forming a first train, a second group of said conveyors is arranged for being connected by said connector means for forming a second train, and another one of said conveyors being disposed between and adjacent to an end of each of said first and second trains in permanent disconnected relationship therewith.

8. An apparatus as set forth in claim 7, wherein said reciprocating means are secured to the end conveyor of said first train and to the end conveyor of said second train and both of the end conveyors being located remote from said conveyor disposed between said first and second trains.

9. An apparatus as set forth in claim 1, wherein said reciprocating means comprises an extendable hydraulic ram being secured at one end in a stationary position along said track and at the opposite end thereof to one of said conveyors for displacing said conveyor to which it is attached and any other said conveyor connected thereto in the longitudinal direction along said track.

References Cited
UNITED STATES PATENTS

| | | | |
|---|---|---|---|
| 850,107 | 4/1907 | Wolever | 198—83 |
| 1,980,634 | 11/1934 | Philips | 198—88 |
| 469,137 | 2/1892 | Hall | 198—92 |
| 767,162 | 8/1904 | McNear | 198—92 |
| 778,613 | 12/1904 | Ward | 198—92 |
| 783,090 | 2/1905 | Acklin | 193—3 |
| 2,720,963 | 10/1955 | Stanley | 198—135 |
| 2,743,025 | 4/1956 | Manierre | 198—92 |
| 2,796,999 | 6/1957 | Russell | 198—92 |
| 3,199,843 | 8/1965 | Abbey | 198—19 |

RICHARD E. AEGERTER, Primary Examiner.